United States Patent
Goto et al.

[19]
[11] Patent Number: 6,095,673
[45] Date of Patent: Aug. 1, 2000

[54] CO-EXTRUDED LIGHT PIPE

[75] Inventors: Kazuhiro Goto, Markham; Andras Gyimes, Toronto; Dragos Luca, Don Mills; Ronal C. Du Pont, Milton, all of Canada

[73] Assignee: The Whitaker Corporation, Wilmington, Del.

[21] Appl. No.: 09/008,950

[22] Filed: Jan. 20, 1998

[51] Int. Cl.[7] .................................................. F21V 8/00
[52] U.S. Cl. ....................... 362/582; 362/307; 362/551; 385/901
[58] Field of Search .............................. 362/31, 551, 560, 362/582, 223, 307, 327; 385/147, 901

[56] References Cited

U.S. PATENT DOCUMENTS

| | | | |
|---|---|---|---|
| 3,666,180 | 5/1972 | Coombs et al. | 362/573 |
| 4,262,327 | 4/1981 | Kovacik et al. | 362/223 |
| 4,322,781 | 3/1982 | Peterson | 362/560 |
| 4,430,692 | 2/1984 | Papadakis | 362/500 |
| 4,623,217 | 11/1986 | Hallen | 385/16 |
| 4,706,169 | 11/1987 | Bussan et al. | 362/26 |
| 4,733,332 | 3/1988 | Yamashita et al. | 362/582 |
| 4,740,870 | 4/1988 | Moore et al. | 362/477 |
| 4,751,617 | 6/1988 | Ryder et al. | 362/511 |
| 4,786,127 | 11/1988 | Molnar | 385/52 |
| 4,811,172 | 3/1989 | Davenport et al. | 362/511 |
| 4,826,273 | 5/1989 | Tinder et al. | 362/488 |
| 4,868,718 | 9/1989 | Davenport et al. | 362/511 |
| 4,871,487 | 10/1989 | Laursen et al. | 264/1.29 |
| 4,887,190 | 12/1989 | Sadamune et al. | 362/560 |
| 4,930,049 | 5/1990 | Davenport et al. | 362/464 |
| 4,954,930 | 9/1990 | Maegawa et al. | 362/26 |
| 4,957,347 | 9/1990 | Zarian | 385/125 |
| 5,021,929 | 6/1991 | Danielian | 362/558 |
| 5,060,119 | 10/1991 | Parthasarathy | 362/565 |
| 5,143,435 | 9/1992 | Kikuchi | 362/574 |
| 5,163,745 | 11/1992 | Zagata | 312/242 |
| 5,170,454 | 12/1992 | Kanai | 385/88 |
| 5,217,290 | 6/1993 | Windross | 362/554 |
| 5,222,794 | 6/1993 | Windross | 362/554 |
| 5,228,765 | 7/1993 | Jones | 362/551 |
| 5,276,594 | 1/1994 | Burkett et al. | 362/540 |
| 5,278,731 | 1/1994 | Davenport et al. | 362/551 |
| 5,311,410 | 5/1994 | Hsu et al. | 362/552 |
| 5,321,586 | 6/1994 | Hege et al. | 362/554 |
| 5,365,413 | 11/1994 | Krammer | 362/464 |
| 5,369,555 | 11/1994 | McKain et al. | 362/578 |
| 5,406,641 | 4/1995 | Bigley, Jr. et al. | 362/551 |
| 5,422,792 | 6/1995 | Neumann | 362/554 |
| 5,436,806 | 7/1995 | Kato | 362/551 |
| 5,438,485 | 8/1995 | Li et al. | 362/558 |
| 5,446,628 | 8/1995 | Blom et al. | 362/551 |
| 5,452,186 | 9/1995 | Dassanayake | 362/511 |
| 5,465,194 | 11/1995 | Currie | 362/464 |
| 5,495,400 | 2/1996 | Currie | 362/551 |
| 5,537,297 | 7/1996 | Ghandehari | 362/560 |
| 5,573,327 | 11/1996 | Dealey, Jr. et al. | 362/485 |
| 5,709,653 | 1/1998 | Leone | 604/20 |
| 5,857,761 | 1/1999 | Abe et al. | 362/551 |
| 5,898,814 | 4/1999 | Yamamoto | 362/551 |

FOREIGN PATENT DOCUMENTS 0 367 032 A3   5/1990   European Pat. Off. .
WO 93/01068    1/1993   WIPO .

*Primary Examiner*—Alan Cariaso

[57] ABSTRACT

A light transmitting strip or light pipe 2 is used to illuminate an elongate area along which the light pipe 2 extends. The illumination is provided by light emanating laterally relative to the axis of the light pipe, and the light intensity is substantially uniform, at least to an observer, along the length of the light pipe 2. The light pipe 2 has a clear light guide section 4 and an opaque section 10 that is separated from the light guide section 4 by an air gap 8. The clear section 4 and the opaque section 10 are joined by top and bottom couplings 12 and 14, and the two sections are formed by coextruding an acrylic resin through a single coextrusion die. Light emitted laterally from the light guide 4 toward the arcuate opaque section 10 is reflected laterally through the clear light guide 4 transverse to the axis of the light pipe 2, so that all light extends through the front surface 6 of the light guide 4. By separating the reflecting opaque section 10 from the clear light guide 2 by an air gap 8, the lighting intensity can be more uniform over the length of the lighting strip or light pipe.

22 Claims, 2 Drawing Sheets

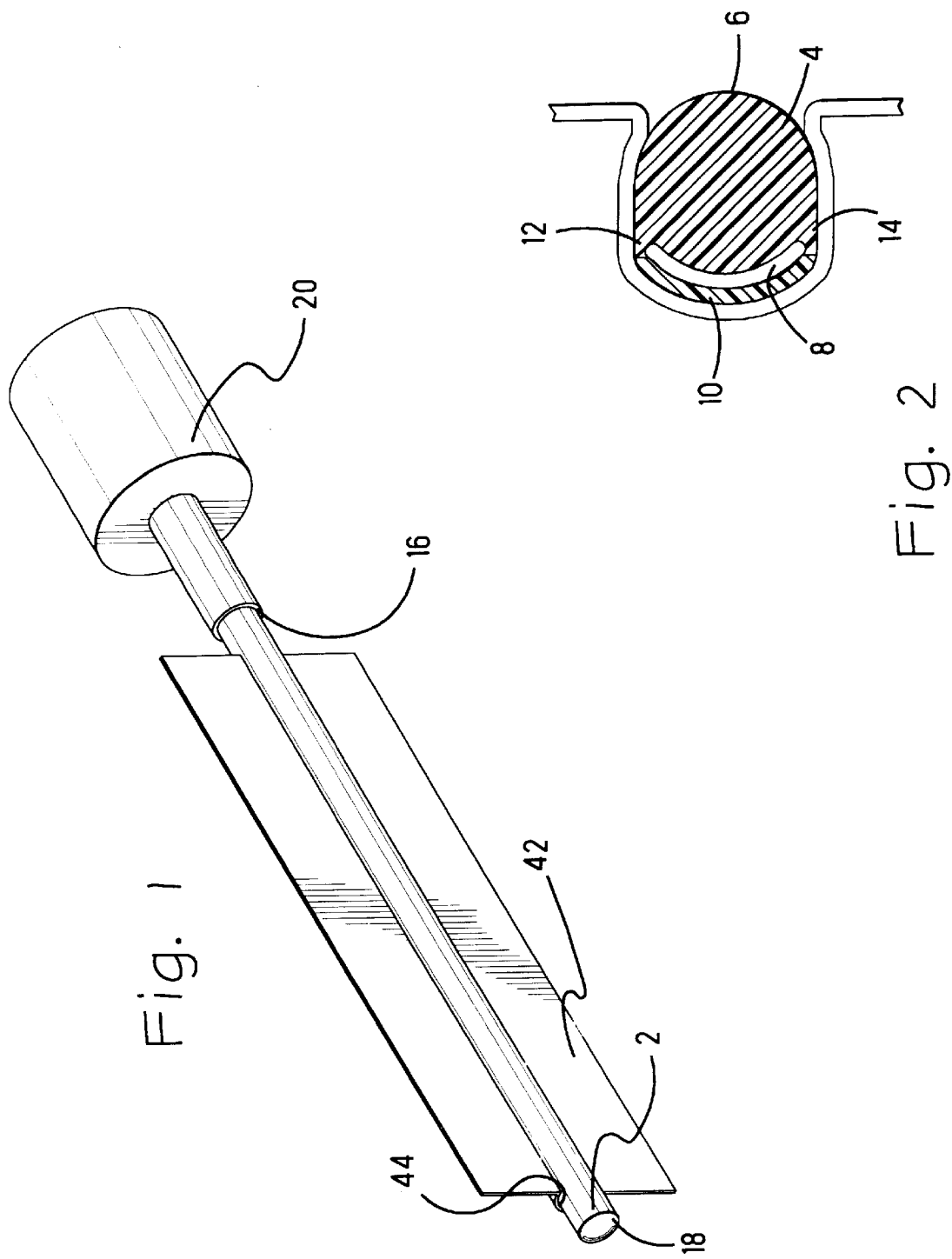

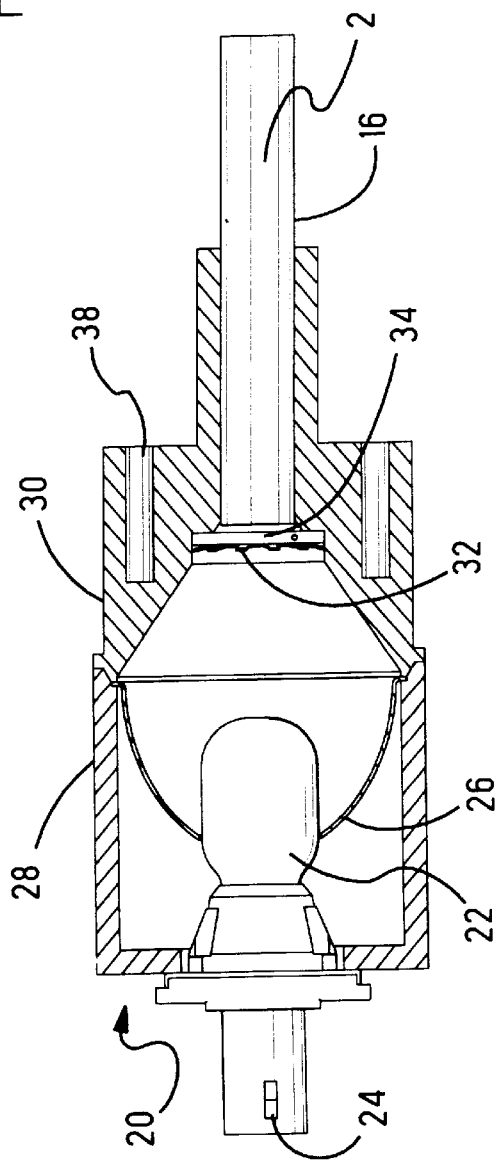
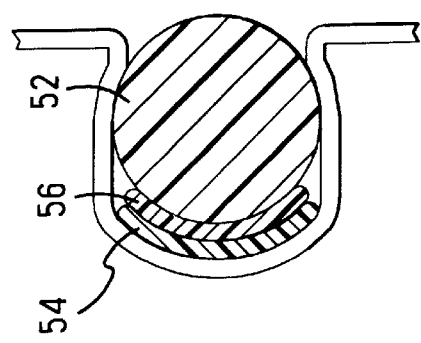
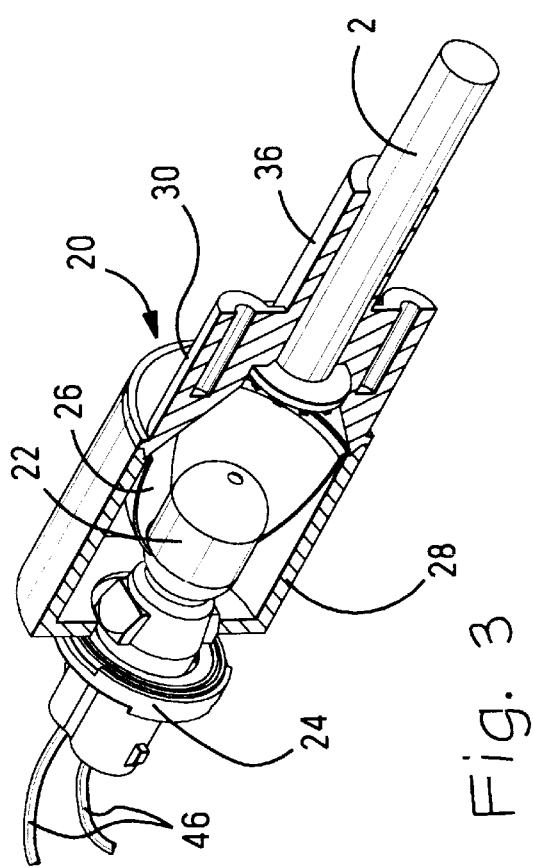

CO-EXTRUDED LIGHT PIPE

BACKGROUND OF THE INVENTION

1. Field of the Invention

This invention is related to light pipes that are used for illumination. More particularly, this invention is directed to an illuminating light pipe that is used to illuminate an elongate area along which the light pipe extends.

2. Description of the Prior Art

Light pipes or light guides can be employed for illumination as well as for high speed signal communication. When used for illumination, light pipes can either be used to transmit light from a source to a remote area to be illuminated, or the light pipes can be used to illuminate an area along which the light pipe extends. If a light pipe has a smooth outer surface with few imperfections, the index of refraction between the light pipe and air will be sufficient to reflect most of the light, propagated through the light pipe or fiber, so most of the light will be transmitted between a light source at one end and the other end of the fiber optic cable or pipe. However, to illuminate the elongate area along the light pipe of fiber, light must be emitted laterally, and to uniformly illuminate this elongated strip or path light should be emitted at comparable levels along the light pipe. Of course, one approach is to use a multi-fiber cable with fibers of different lengths arrayed to emit light from the ends of the individual fibers at points spaced along the length of the multi-fiber cable. However, deployment of cables or fibers at discrete locations would require a relatively complicated and costly assembly.

Optical fiber lighting apparatus can employ several techniques for scattering light propagating within the light fiber of light pipe into lateral modes of illumination to illuminate the area surrounding the light pipe. One approach is to employ scattering centers within the core to scatter propagating light outwards so that light is emitted laterally in the vicinity of the scattering centers. Another approach is to roughen portions of the core layer at the interface with the clad layer of the optical fiber to scatter light impinging on the core-clad interface. By roughing the surface, the index of refraction is altered so that more light can be laterally emitted from the light pipe or fiber. Although the core dimensions of the fiber or pipe remain constant for these two approaches, the light pipe is not uniform along the length of the pipe. Either discrete areas along the axis or length of the fiber or pipe must be roughened, or the scattering centers must be added at discrete locations. Therefore, the pipe or fiber cannot be fabricated on a continuous basis, or if a continuous fiber is used, it must be subjected to secondary operations to roughen the surface.

If the surface of a cable is roughened along the entire length of the fiber, either at the core-clad interface, or along the exterior of a fiber that does not include a clad layer, light will not be emitted uniformly along the length of the fiber or pipe. A large portion of lateral light emission will occur adjacent to the light source and the lateral light emission will be significantly less near the remote end of the light pipe. A light pipe that is continuously roughened in this manner is not suitable for use in providing substantially uniform illumination along an elongate surface or area, such as along step or the edge of a structure.

Another approach that has been employed is to position reflectors along one side of a light pipe or fiber optic cable so that light emitted from one side will be reflected back onto an area on the opposite side of the light pipe. One approach employs multiple reflectors with progressively varying indices of reflection located along the length of the cable. This approach relies on the variation of the index of reflection of the separate reflectors to overcome the variation in the illumination along the length of the cable. Multiple reflectors or mirrors are necessary for this approach so that it would not constitute a low cost solution to the problem.

One other approach varies the geometry of the cable along its length, but this nonuniform cable would be more costly than a light pipe having a constant cross sectional area.

Each of these approaches is unsatisfactory when used to provide uniform illumination along a surface or edge of a structure to highlight this structure for safety or other reasons. For example, it is desirable to use a light pipe to illuminate a step up surface on a motor vehicle to increase the visibility and therefore the safety of such a feature. For both practical and aesthetic reasons, the illumination should be uniform along the length of such an elongate structure, or at least the feature should be comparably illuminated along its length. Since the light pipe is intended to illuminate the feature, a slight light intensity variation that would not be noticeable to an observer or user would still be acceptable. One attempt to provide a low cost light pipe of this type was to paint one side of a light pipe that would be mounted in a slot or channel on the vehicle. The paint would provide an opaque surface on one side that would hopefully reflect light back through the light pipe onto the exterior of the structure on which this light pipe was mounted. However, it was found that most of the light was emitted adjacent the light source and the area at remote end of the light pipe was inadequately illuminated.

SUMMARY OF THE INVENTION

The instant invention overcomes the limitations of the prior art by providing a light pipe, with a constant cross sectional area, from which light may be laterally emitted at substantially uniform levels over the length of the light pipe. Since the light pipe has a constant cross sectional area, a thermoplastic light pipe in accordance with this invention can be extruded. This light pipe can therefore be used in a number of cost sensitive applications, such illuminating an elongate surface to provide greater safety for users.

The instant invention comprises a light transmitting strip for illuminating an elongate area between a location relatively proximate to a light source and a location relatively remote from the light source. With this invention the light intensity at the relatively remote location is approximately comparable to the light intensity at the relatively proximate location. This light transmitting strip includes a relatively clear light guide having a length equal to the distance between the relatively proximate location and the relatively remote location. The lighting transmitting strip or light pipe also includes a reflective member extending adjacent the light guide, and an air gap between the reflective member and the light guide. The preferred method of fabricating this invention is to coextrude the light guide and the reflective member. The reflective member can be fabricated from the same resin used to fabricate the clear light guide with fillers added to make the reflective member relatively opaque.

BRIEF DESCRIPTION OF THE DRAWINGS

FIG. 1 is a view of a lighting strip including a light source located at one end of a light pipe.

FIG. 2 is a cross sectional view of at light pipe showing a coextruded clear light guide section and a relatively opaque reflecting member on the opposite side of an air gap.

FIG. 3 is a perspective view, in section showing the lighting strip.

FIG. 4 is a section view of the lighting strip.

FIG. 5 is a cross-sectional view of an alternate embodiment in which a clear light guide is separated from a reflective member by a third layer.

DETAILED DESCRIPTION OF THE PREFERRED EMBODIMENT

The preferred embodiment of this invention is a light pipe, light transmitting strip, or lighting strip 2. This light pipe 2 illuminates an elongate area between opposite ends thereof so that the light intensity along the length of the elongate area is approximately constant or uniform and the light levels at each location along the light pipe 2 is comparable regardless of the distance from a light source 20 containing a bulb or other light emitter located at one end of the light pipe 2. FIG. 1 shows the manner in which the light pipe 2 is mounted with respect to a light source 20. In the representative embodiment, shown herein the light source 20 is mounted at one end of the light pipe 2. Of course in other embodiments, a light source could be located at both ends of the light pipe 2.

Light pipe 2 is an extruded member that has a constant cross section along its entire length. The light pipe 2 has two sections, a relatively clear light guide 4 and a relatively opaque section 10, that is separated from the relatively clear light guide by an air gap 8. The clear light guide 4 and the opaque section 10 are coextruded to form an axially extending member of constant, but noncircular, cross section. Both the clear light guide 4 and the relatively opaque section 10 are formed from an acrylic resin. In the preferred embodiment, the same resin is used for the clear light guide section 4 and for the opaque section 10, with white pigment or paint added to the acrylic resin as a filler to form the opaque section 10. The preferred resin used to form light pipe 10 is an acrylic resin, but other clear resins, such as polycarbonate, polystyrene, ABS and others can be used depending upon the application. The clear resin and a resin with the opaque filler are each fed to a coextrusion die in a molten or fluid form and the two section light pipe is formed by this single die.

As shown in FIG. 2, the opaque section 10 is located on one side or at the rear of the clear section 4. The clear section 4 is substantially circular in cross section with an exposed or front side 6, opposite the relatively opaque section 10. The front side 6 is curved, and in the preferred embodiment is generally circular. The opaque section 10 his an arcuate cross section and is separated along most of its extent by air gap 8, which also has an arcuate cross section. In the preferred embodiment, the width of this gap is approximately 0.03 inch. The inner surface of the opaque section 10 is a concave section that will gather or reflect light emitted laterally from the rear of the clear light guide section 4, and direct that light laterally through the clear light guide section 4 and out the front side 6 of the clear light guide 4. Thus opaque section 10 comprises a reflector to redirect light normally emitted from the rear side of light guide 4.

As shown in FIG. 2, the opaque or reflective member 10 is joined to the clear light guide section 4 only at the top and bottom of the air gap 8. A top coupling section 12 and a bottom coupling section 12 extend substantially tangentially from the top and bottom of the clear acrylic light guide 4 respectively to the top and bottom of the opaque arcuate reflective section 10. The tops and bottoms of the light pipe 12 are therefore substantially flat. The inner portion of each coupling section 12 and 14 is clear and the outer portion adjacent to the opaque reflector 10 is also opaque. The joining line between clear and opaque sections is therefore located in the two tangentially extending couplings 12 and 14. The opaque material does not extend into the substantially circular clear section where it would be in line with the light propagating in the light guide 4. Therefore light propagated in the clear light guide section 4 will not strike opaque sections in either coupling 12 or 14.

The manner in which the light pipe 2 forms a light transmitting strip to illuminate an elongate area is shown schematically in FIG. 1. A light source 20 is located at one end of the light pipe 2 to form a lighting strip or lighting apparatus. The light source 20 is located at one end of the light pipe, and the light pipe extends from the proximate end 16 to a remote end 18. The laterally emitted light intensity at the remote end 18 should be comparable to the light intensity at the proximate end 16 in order to provide substantially uniform illumination, at least to an observer, along the wall 42. The light pipe 2 is mounted in a channel or slot 44 of the wall 42 and the light is laterally emitted only through the front section 6 of the clear light guide section 2. Of course, the precise light intensity at the remote end 18 need not be exactly the same as the light intensity at the proximate end. Some decrease or decay is to be expected, but the intensity should not drop off with the square of the distance from the light source 20, or at any rate that would be noticeable to an observer. The rate of lateral intensity along the length of the light pipe 2 is reduced for that of a light pipe with a roughened surface, because the surface of light guide 4 is smooth without a large number of asperities or imperfections that would reduce the index of refraction at the air-core interface. Thus most, but not all, light is reflected at this interface and continues to be propagated toward the remote end of the light guide 4. Of course there are still some imperfections at this interface, causing light to escape laterally. Thus only light which escapes the clear light guide 4 strikes the opaque reflective member 10 and is in turn redirected out the front of the lighting strip. Since imperfections have not been added to the light guide 4, as by roughening the surface, a greater proportion of the light reaches remote areas of the light pipe 2 resulting in a more even distribution of illumination along the lighting strip.

FIGS. 3 and 4 show that light pipe 2 is connected to the light source 20 to form the lighting strip apparatus which is used to uniformly illuminate the surface along which the light pipe extends. A bulb 22 is mounted in a conventional bulb socket 24. The bulb 22 is also mounted in a reflector 26 and the light from the bulb is then directed on the proximate light pipe end 16 which is mounted in the diecast aluminum light source body comprising a lamp body 28 and an end cap 30. A retaining ring 32 secures the light pipe 2 in the body and a heat shield 34 prevents exposure of the light pipe 2 to relatively high temperatures that might damage the proximate end 16 of the light pipe 2. A support collar 36 on the end cap 30 extends along the exterior of the light pipe 2 for a short distance to prevent damage and the assembly can be mounted by screws inserted in mounting holes 38. The proximate end 16 can be sealed, either in the vicinity of or by the support collar 36 and the remote end 18 can also be sealed to prevent dirt or other contaminants from entering the air gap 8. Commonly available sealants or a flexible cap can be used for this purpose. Wires 40 extend from the bulb socket 24 to connect the light source 20 to a source of electrical power.

Preferably, the light from the bulb 20 is focused on the clear light guide 4, since this is the only portion of the light pipe 2 that would transmit light along the length of the lighting strip. The opaque reflecting member 10 would be at least partially offset from the focus of the lamp reflector 26, but would extend parallel to the light guide 4 along the length of the light pipe 2.

The preferred embodiment of this invention is intended to illuminate the edge of a step on a motor vehicle, such as the step of a sport utility vehicle. Illuminating of this edge would enhance the safety of vehicles of this type since the step, which can be quite high for children and smaller or older adults, would be clearly visible. Uniform illumination is therefore important along the entire length of the step. The preferred embodiment would be capable of providing sufficient and substantially uniform illumination along a strip having a length of at least five feet.

FIG. 5 shows an alternate embodiment of this invention in which the light guide 52 is separated from the reflective member 54 by an intermediate member 56 having a lower index of refraction than the reflective member, such as Teflon, a synthethic resinous fluorine used for molding and extrusion. Teflon is a trademark of E.I duPont deNumours. The intermediate member 56 replaces the air gap 8 in the preferred embodiment of FIGS. 1–4, and has the same cross section as the air gap. This three member laminate can also be coextruded with all three materials being joined in the same coextrusion die.

The preferred embodiment of the invention depicted herein is merely representative of this invention. Other modifications would be apparent to one of ordinary skill in the art. For example, the cross section of the light guide need not be circular. A flat light guide could be employed. Similarly, the reflecting member need not have a concave configuration to concentrate light in one direction. In other applications, the reflective member could be convex to disperse illumination. It would also be possible to remove selected portions of the reflective member to vary the illumination in a discontinuous manner. Although this invention possesses certain advantages when manufacturing the light pipe by a continuous coextrusion process, the broader aspects of this invention are not limited to light pipes that are coextruded. For example, the light guide and the reflective member could be separately fabricated and then assembled in their final configuration. Another modification would be to employ this invention with a clad light guide. These modifications are only intended to be representative of those that would be apparent to one of ordinary skill in the art. Therefore this invention is defined by the following claims and not by the representative embodiment depicted herein.

We claim:

1. A light transmitting strip for illuminating an elongated area between a location relatively proximate to a light source and a location relatively remote from the light source so that the light intensity at the relatively remote location is approximately comparable to the light intensity at the relatively proximate location, the light transmitting strip comprising:
   a relatively clear light guide having a length equal to the distance between the relatively proximate location and the relatively remote location, wherein said light guide comprises an extruded material;
   a reflective member extending adjacent the light guide, wherein said reflective member comprises an extruded material; and
   wherein said light guide and reflective member are spaced apart to define an air gap therebetween.

2. The light transmitting strip of claim 1 wherein the cross sectional configuration of the light transmitting strip is constant between the relatively proximate location and the relatively remote location.

3. A light transmitting strip have proximal and distal ends relative to the source of light, the light transmitting strip comprising:
   a relatively clear light guide extending between said proximal and distal ends and comprising an extruded material;
   a reflective member extending adjacent the light guide, wherein said reflective member comprises an extruded material;
   wherein said light guide and reflective member are coextruded to form a continuous structure and are spaced apart to define an air gap therebetween; and
   wherein the cross sectional configuration of the light transmitting strip is constant between the proximal and distal ends.

4. A light transmitting strip comprising:
   a relatively clear light guide wherein said light guide comprises an extruded material;
   a reflective member extending adjacent the light guide, wherein said reflective member comprises an extruded material and an opaque filler; and
   wherein said light guide and reflective member are spaced apart to define an air gap therebetween and the reflective member is joined to the light guide on opposite ends of the air gap.

5. The light transmitting strip of claim 3 wherein the reflective member comprises an arcuate member.

6. The light transmitting strip of claim 5 wherein the reflective member comprises a relatively opaque portion of the coextruded light transmitting strip.

7. The light transmitting strip of claim 6 wherein the reflective member comprises a white member.

8. The light transmitting strip of claim 6 wherein the light guide comprises a clear acrylic member and the reflective member comprises a relatively opaque acrylic member coextruded with the clear light guide.

9. The light transmitting strip of claim 8 wherein the reflective member and the light guide are coextruded.

10. An elongated light pipe having a front and back orientation perpendicular to its length and comprising two coextruded axially extending sections, the first section being relatively clear and the second section being relatively opaque, the second section extending along a back portion of the first section and opposing a front portion of the first section, wherein said second section reflects incident light along the length of the light pipe to illuminate the front portion.

11. The light pipe of claim 10 wherein the relatively opaque section is separated from the relatively clear section by an air gap.

12. The light pipe of claim 11 wherein the relatively opaque section is joined to the relatively clear sections at the top and the bottom of the air gap.

13. The light pipe of claim 12 wherein the air gap has an arcuate cross section with the relatively opaque section forming a generally converging lens on one side of the air gap and with the relatively clear section having a generally circular cross section on the opposite side of the air gap.

14. The light pipe of claim 13 wherein the relatively clear section includes substantially tangential sections extending from the top and bottom of the circular cross section and located at the top and bottom of the air gap to join the relatively clear section to the relatively opaque section.

15. The light pipe of claim 10 wherein the relatively opaque section is arcuate and an opposite side of the relatively clear section is arcuate, the top and the bottom of the light pipe having flat surfaces.

16. The light pipe of claim 10 wherein the relatively opaque section and the relatively clear section are each molded from an acrylic resin.

17. The light pipe of claim 10 wherein the finish of the exterior of the relatively clear section is substantially constant between opposite ends of the light pipe.

18. The light pipe of claim 10 wherein the relatively clear first section is separated from the relatively opaque second section by an intermediate layer having an index of refraction lower than the second section.

19. A lighting strip comprising:

a light source located at one end of the lighting strip;

an elongated light pipe having a constant cross section and a front and back orientation perpendicular to its length which extends from the light source to a distal end, said light pipe comprising two co-extruded sections, the first section being a clear light guide and the second section being a relatively opaque reflecting member and extending along a back portion of the first section and opposing a front portion of the first section, wherein said second section reflects incident light through the first section along the length of the front portion; and wherein said first and second sections are spaced apart to define an air gap therebetween.

20. The light transmitting strip of claim 1, wherein the extruded materials of the light guide and the reflective member are formed from clear resins, and said reflective member further comprises opaque filler.

21. The light transmitting strip of claim 20, wherein the clear resins of the light guide and the reflective member are independently selected from the group consisting of: acrylic resin, polycarbonate, polystyrene and ABS.

22. The light transmitting strip of claim 21, wherein the clear resins of the light guide and the reflective member are acrylic resins.

* * * * *